United States Patent [19]

Lohne et al.

[11] 3,760,161

[45] Sept. 18, 1973

[54] METHOD AND APPARATUS FOR AUTOMATICALLY RETRIEVING INFORMATION FROM A SUCCESSION OF LUMINESCENT CODED DOCUMENTS WITH MEANS FOR SEGREGATING DOCUMENTS ACCORDING TO THEIR CHARACTERISTICS

[75] Inventors: William E. Lohne, New Hope, Pa.; John R. Montgomery, Trumbull, Conn.; Jay L. Carley; Richard Darling, both of Fairfield, Conn.; William R. Smith-Vaniz, Darien, Conn.

[73] Assignee: American Cyanamid Company, Stamford, Conn.

[22] Filed: May 19, 1971

[21] Appl. No.: 144,877

[52] U.S. Cl.235/61.11 E, 179/100.2 T, 235/61.12 R, 340/146.3 F

[51] Int. Cl........ G11b 5/74, G06k 9/04, G06k 7/12, G06k 13/06

[58] Field of Search .............. 235/61.11 E, 61.12 N; 340/146.3 K, 146.3 F; 346/74; 179/100.2 T; 209/74; 250/219 D

[56] References Cited

UNITED STATES PATENTS

| | | | |
|---|---|---|---|
| 3,444,517 | 5/1969 | Rabinow | 340/146.3 F |
| 3,225,177 | 12/1965 | Stites | 235/61.11 E |
| 3,502,851 | 3/1970 | Kakimoto | 235/61.12 R |
| 3,235,660 | 2/1966 | Treseder | 340/146.3 F |
| 3,488,453 | 1/1970 | Chupity | 179/100.2 T |
| 3,418,456 | 12/1968 | Hamisch | 235/61.11 E |
| 3,052,350 | 9/1962 | Marcovitz | 209/74 |
| 3,238,357 | 3/1966 | Minka | 235/61.11 E |
| 2,958,568 | 11/1960 | Hagelbarger | 346/74 |
| 3,470,357 | 9/1969 | Ritzerfeld | 235/61.11 D |
| 3,354,432 | 11/1967 | Lamb | 235/61.11 D |

*Primary Examiner*—Maynard R. Wilbur
*Assistant Examiner*—Robert M. Kilgore
*Attorney*—Bryan, Parmelee, Johnson & Bollinger

[57] ABSTRACT

A method and device are provided of the type arranged to accept documents bearing a code, to retrieve the coded information from the documents for subsequent use as electric signals, and to deliver the documents to an output station where they are periodically removed for storage, for mailing, or for other purposes. The device is arranged to retrieve information from documents typically bearing standard typographic information (e.g., typewriter characters formed with carbon-based inks) and, in addition, bearing a corresponding code, such as a bar code, formed with a photoluminescent material which is invisible until stimulated with ultraviolet radiation. To retrieve information from such documents, the device feeds the documents through a scanning stage which detects the luminescent code and supplies a corresponding electrical signal, and then through a stacking stage which segregates the documents according to information contained thereon or according to a determination that the documents have been processed either acceptably or unacceptably. The scanning stage retrieves information by guiding the document through a region illuminated only with ultraviolet light, causing only the luminescent areas to emit radiation, and stationing in this region a scanning wheel which successively passes a scanning field, optically coupled to a photodetector, across the document. The scanning wheel is preferably provided with a plurality of peripheral lenses which focus an image of the document, which is held in a arcuate guide, to a central fixed photodetector. After scanning, the document feed carries the document to a stacking stage which has a document ejection station with selectively engageable constantly moving feed means for delivering documents with one characteristic to one location and documents with another characteristic to a second location. Documents bearing visible characters as well as an invisible luminescent code are thus automatically processed in succession by a continuously operating device receiving coded documents, accurately retrieving the coded information therefrom, and conveniently segregating the documents into a plurality of output bins according to their characteristics.

7 Claims, 18 Drawing Figures

United States Patent [19] [11] 3,760,161
Lohne et al. [45] Sept. 18, 1973
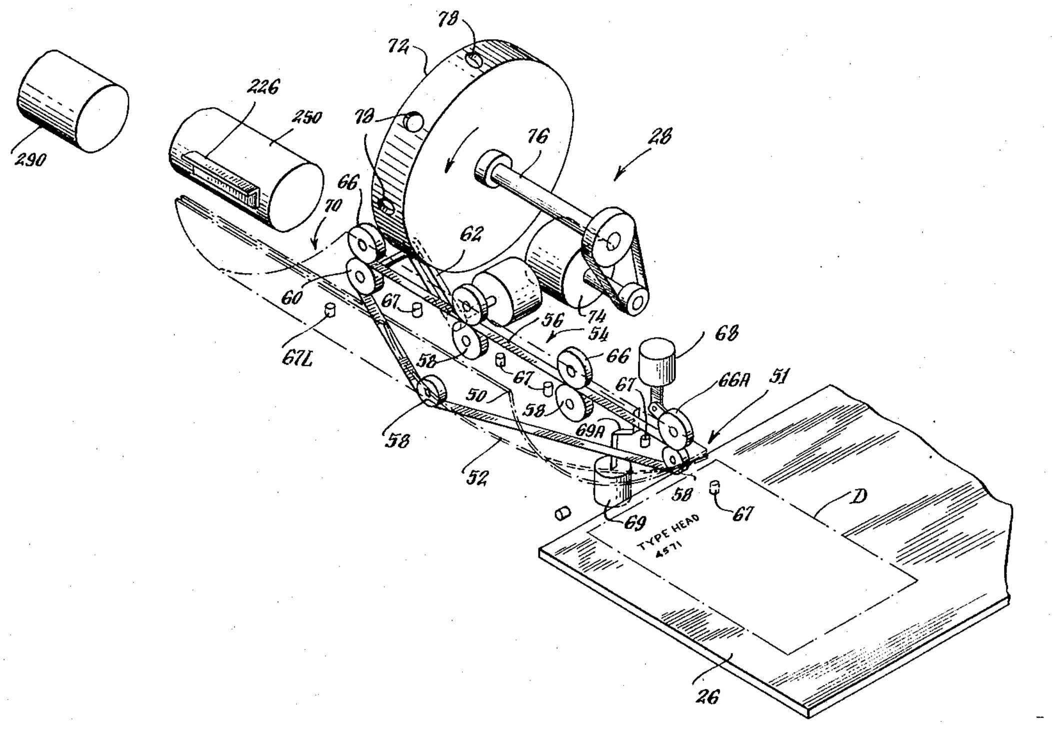

INVENTORS.
William E. Lohne
John R. Montgomery
Jay L. Carley
Richard Darling
BY William R. Smith-Vaniz Bryan, Parmelee, Johnson & Bollinger
ATTORNEYS Bryan, Parmelee, Johnson & Bollinger
ATTORNEYS Bryan, Parmelee, Johnson & Bollinger
ATTORNEYS Bryan, Parmelee, Johnson & Bollinger
ATTORNEYS Bryan, Parmelee, Johnson & Bollinger
ATTORNEYS Bryan, Parmelee, Johnson & Bollinger
ATTORNEYS Bryan, Parmelee, Johnson & Bollinger
ATTORNEYS Bryan, Parmelee, Johnson & Bollinger
ATTORNEYS Bryan, Parmelee, Johnson & Bollinger
ATTORNEYS Bryan, Parmelee, Johnson & Bollinger
ATTORNEYS Bryan, Parmelee, Johnson & Bollinger
ATTORNEYS Bryan, Parmelee, Johnson & Bollinger
ATTORNEYS

METHOD AND APPARATUS FOR AUTOMATICALLY RETRIEVING INFORMATION FROM A SUCCESSION OF LUMINESCENT CODED DOCUMENTS WITH MEANS FOR SEGREGATING DOCUMENTS ACCORDING TO THEIR CHARACTERISTICS

BACKGROUND OF THE INVENTION

1. Field of the Invention

The field of the present invention relates to methods and apparatus accepting documents bearing coded information, and automatically retrieving the coded information by converting it into some form of electrical signal which is forwarded to electronic processing equipment, such as a computer, data processor, or memory device.

2. Description of the Prior Art

It has been recognized that in a variety of contexts it is desirable to provide documents which can be read both by man and by machine. A typical example is in the field of banking, where checks must be readable, in ordinary commerce, by men, and desirably also are readable by machine to simplify sorting and accounting transactions performed by the bank. Numerous other examples are currently available, and the existence of a practical and economical coding and retrieval system would provide many new fields of use.

The marking of documents to make them both man and machine readable has taken several forms. Pattern recognition devices may be used to identify a particular stylized alphanumeric character shape formed, for example, with magnetic ink. In addition, techniques have been proposed whereby alphanumeric characters (man readable) are accompanied by corresponding binary code symbols (machine readable). Examples of the latter technique are found in British Pat. No. 705,605 (Broido) and in U.S. Pat. No. 3,486,006 (Siegel). One difficulty presented by the addition of machine readable code, such as bar code, to a document is that the code symbols are generally considered to detract from the document appearance and may at times interfere with or distract from reading of the humanly readable alphanumeric characters. Accordingly, it would be desireable to form the alphanumeric characters with a visible material (e.g., a carbon-based ink), and to form the code symbols with a material which is essentially invisible under ordinary radiation but which can be detected by some reliable technique. Obviously, such documents and their code symbols to be fully effective, useful, and practical, must not only be conveniently man readable, but also must be machine readable with reasonable speed, accuracy and reliability, and therefore a need arises to provide methods and apparatus capable of achieving these objectives.

SUMMARY OF THE INVENTION

Objects of the present invention are to provide a method and apparatus for retrieving information from documents carrying invisible code symbols which provides automatic retrieval from a succession of coded documents, which provides means for determining whether the documents are properly processible, which enables documents to be segregated according to this determination, and which therefore permits such documents to be read by a machine with speed, accuracy, and reliability.

In order to achieve the foregoing objects, the present invention basically entails marking the document in such a way that its code, while ordinarily invisible, can be read under ultraviolet light, reading the document in a device set up to distinguish the code from the humanly readable text which is interspersed with the code on the document, and then passing along the successfully read coded information as electrical signals to another device set up to accept and usefully manipulate that form of information, such as a computer, document sorter, or data processor.

According to the invention, adjacent each visible alphanumeric character the documents bear code symbols of a photoluminescent material which is essentially invisible under ordinary radiation but which is stimulated by ultraviolet radiation to emit in the visible spectrum, and the information contained in the symbols is retrieved in a process which involves continuously feeding a document along a path past a scanning station, illuminating the document at the scanning station with ultraviolet radiation, successively scanning across the document with scanning means sensitive to the wave length of radiation emitted by the luminescent material, thereby to retrieve the coded information notwithstanding the presence of other alphanumeric characters on the document. Preferably the document is multiply scanned to retrieve redundant information which can be compared for accuracy, and the scanning means has a threshhold device to eliminate background signals. In more detailed aspects, the document is guided with an arcuate curvature in a plane normal to the path travelled by the document, and the document is scanned along said normal plane at the scanning station by rotating a scanning wheel having an axis coinciding with the center of the arcuate curve formed by the document. The document is scanned by interposing between the document and a fixed photosensitive element a succession of optical devices carried by the scanning wheel, each optical device establishing a field of view for the photodetector which is caused to travel across the document by rotation of the scanning wheel.

The photodetector translates the optical code information to electrical signals which are transmitted to an electronic processing means which analyzes the information, stores the information, or directly uses the information in a contemporaneously operating system.

The processing means may also supply information about a document which can be used immediately in order to segregate documents of one characteristic from those of another characteristic. This is another aspect, the present invention continues feeding the documents from the scanning station to an ejection station, and then, in response to a control, feeding a document from the ejection station along a first transverse path if the document is of one type (e.g. acceptable) and along a second transverse path if the document is of another type (e.g., unacceptable). Constantly operating feed devices extend from the ejection station along said two paths, and the document is engaged with the feed means of one or the other path according to a received signal from the control means, as soon as the trailing edge of the document arrives at the ejection station as determined by sensing means, thereby clearing the ejection station rapidly and enabling documents of various lengths to be processed in succession without the necessity of spacing them a predetermined distance apart.

To carry out the foregoing processes, the present invention provides an apparatus which comprises means for feeding documents along a path to a scanning station, means at the scanning station for illuminating the document with ultraviolet radiation, and means at the scanning station for scanning across the moving document to detect radiation emitted from the luminescent code symbols thereon. The information supplied by the code is transmitted to processing means, which may determine whether the document has been read in acceptable fashion. The feed means carries the document from the scanning station to an ejection station, which has means for feeding a document therefrom along a first path, means for feeding a document therefrom along a second path, and selectively operable means responsive to a control means for engaging a document with one or the other of said feed means, whereby the document is segregated from the others according to its characteristics.

These and other objects and novel aspects of the invention will be apparent from the following description of a preferred embodiment.

DESCRIPTION OF THE PREFERRED EMBODIMENT

Figures 1, 2, 3:
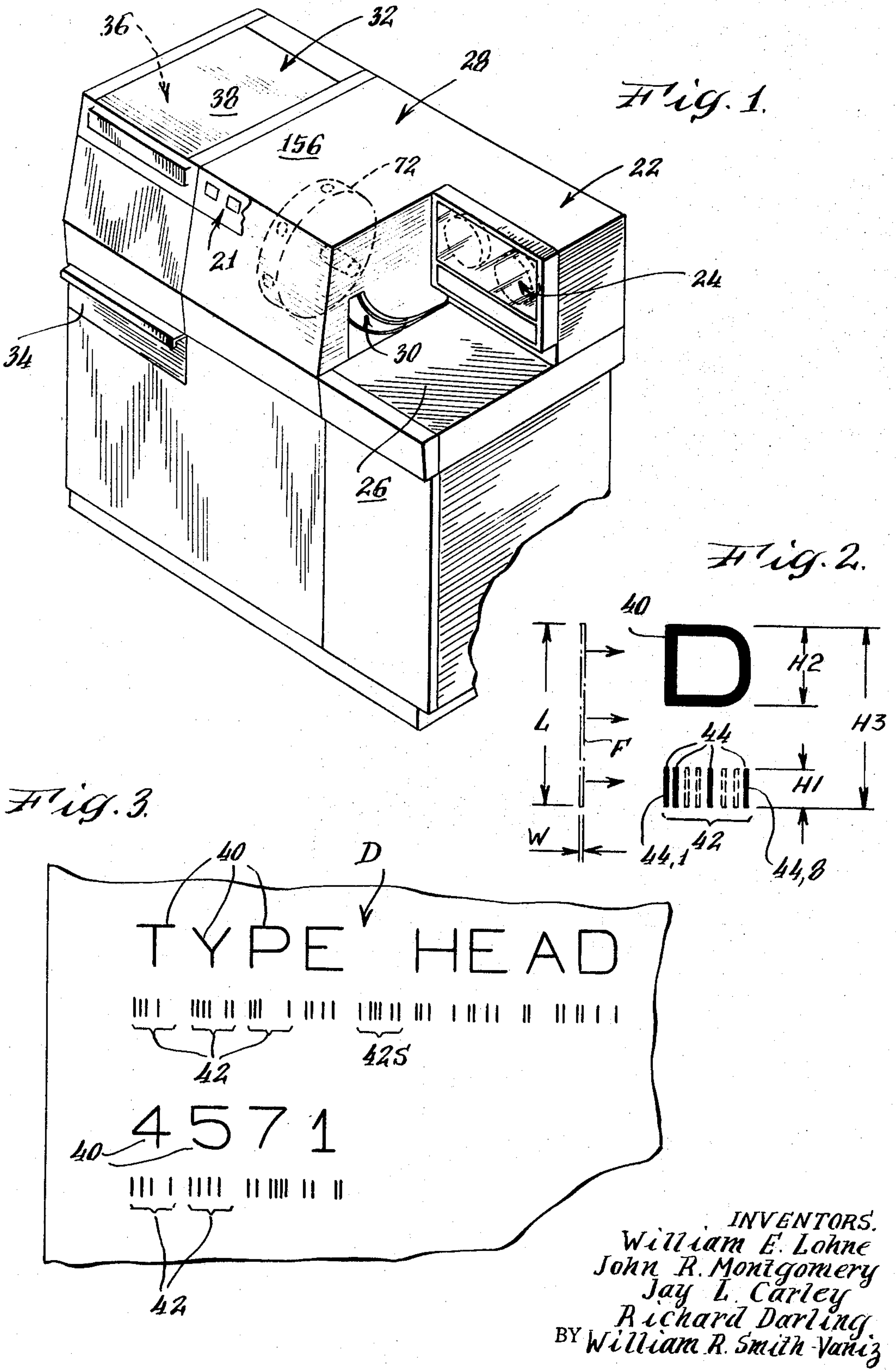
FIG. 1 is perspective view of document reading apparatus according to the present invention.
FIG. 2 is an example of a code to be imprinted on documents read according to the present invention.
FIG. 3 is an illustration of a document bearing alphanumeric characters with cprresponding luminescent code symbols (shown as they appear when stimulated by ultraviolet radiation)
Figure 4:
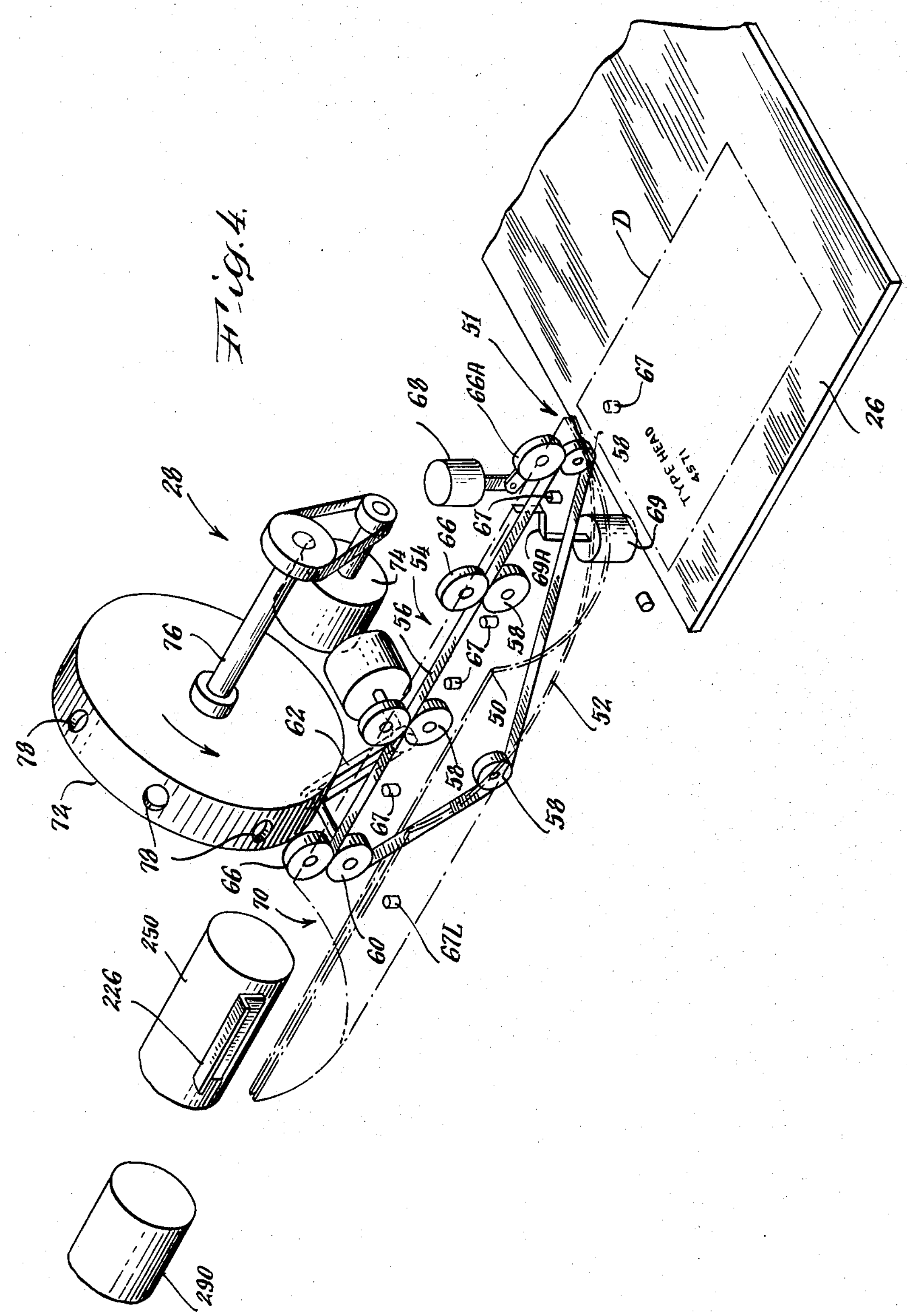
FIG. 4 is an essentially schematic perspective view of the scanning stage of the apparatus depicted in FIG. 1.
Figure 5:
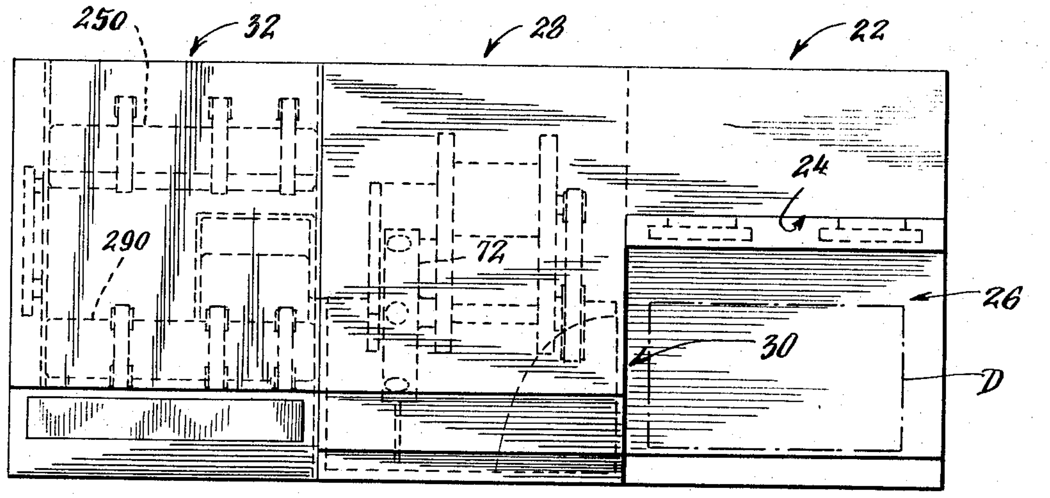
FIG. 5 is a plan view of the apparatus depicted in FIG. 1.

FIG. 1 illustrates the general layout and external appearance of an apparatus 20 according to the invention and arranged to automatically retrieve information from documents bearing luminescent code symbols, and shows a control panel 21 and an operator's station 22 which includes a tape deck 24 for storing information retrieved by the apparatus 20 and a table surface 26 for holding documents which are to be fed into apparatus 20 for reading. Adjacent the operator's station 22, apparatus 20 is provided with a scanning stage 28 having an entrance aperture 30 for receipt of documents to be read. Adjacent scanning stage 28, apparatus 20 has a stacking stage 32 which receives documents from the scanning stage 28 and deposits them either in an "accept" drawer 34 or in a "reject" bin 36 (positioned below cover 38).

DOCUMENT CODING

A portion of a document D of the type to be read by apparatus 20 is shown in FIG. 3, and an enlarged example of the code imprinted thereon is shown in FIG. 2. Rows of alphanumeric characters 40 provide a man readable message such as the illustrated "TYPE HEAD" or "4571." Accompanying each alphanumeric character 40 is a corresponding group 42 of binary code symbols 44 in the form of rectangular vertical bars. As shown, a group **42*s* of code symbols is also provided to correspond to a blank character space. The alphanumeric characters 40** are imprinted, as with a typewriter key, using conventional visible inks, for example with a carbon base.

The code symbols or bars 44, on the other hand, are formed with a colorless photoluminescent material known conventionally as a luminescer. Examples of suitable luminescent materials to be used for code symbols 44 may be found in U.S. Pat. 3,473,027 to Freeman et al. The materials described in this patent luminesce in an optically detectable wavelength under ultraviolet or other short wavelength illumination. It is contemplated that the code symbols 44 will be imprinted on document D simultaneously with the alphanumeric characters 40, as in the manner described in U.S. Pat. No. 3,486,006 to Siegel wherein a type bar carries both the character imprinter and the code imprinter and strikes a ribbon with different zones furnishing the visible and luminescent materials which are simultaneously imprinted.

The code format of symbols 44 in each group 42 corresponding to an alphanumeric character 40 may be selected according to the nature of the document D, the number of characters 40 to be coded, and other criteria. The particular code format illustrated for the purpose of describing the present invention employs eight possible symbol positions in each code symbol group 42. The first bar 44.1 serves as a starting mark to identify the remaining symbols in the group as they are scanned and always contains a code bar. The next six bar symbol positions are used to identify the printed character 40 and the last or eighth bar position 44.8 by its presence or absence serves as a parity check to identify errors in the reading process.

In one commonly used format, the vertical space H1 occupied by the code symbols 44 is 0.030 inches, the vertical space H2 occupied by alphanumeric character 40 is 0.070 inches, and the vertical space H3 occupied by a full line comprising character 40 and its corresponding code group 42 is 0.150 inches. The code bars 44 are approximately 0.005 inches wide and are equally spaced.

SCANNING STAGE

Documents D are read in apparatus 20 as they pass through scanning stage 28, illustrated in FIGS. 4 through 9. As shown essentially schematically in FIG. 4, a document D entering scanning stage 28 through entrance aperture 30 is propelled along edge guide 51 between arcuate guide sheets 50, 52 by a feed means 54 which comprises a constantly moving belt 56 trained over guide wheels 58 and driven by a drive wheel 60 connected via drive belt 62 to an electric motor 64. Document D is held against belt 56 by upper idler rolls 66 which make frictional contact therewith. A plurality of edge sensors 67 detect the presence of a document D properly inserted within scanning stage 28, and a pair of solenoids 68 and 69 responding to sensors 67 bring initial idler roll 66A into engagement with document D to initiate the feed and remove a block 69A.

A document D engaged by feed means 54 travels through guides 50, 52 assuming the arcuate shape thereof, and is carried through a scanning station 70 within the scanning stage 28. At scanning station 70, upper arcuate guide 50 is cut away to expose the surface of document D to a scanning wheel 72 which is constantly rotated by a motor 74 on a shaft 76 whose axis coincides with the center of curvature of arcuate guides 50, 52. On its outer periphery, scanning wheel 72 has a plurality, preferably six, of scanning ports 78 which are successively rotated across scanning station 70 in order to retrieve information from coded document D.

Figure 9:
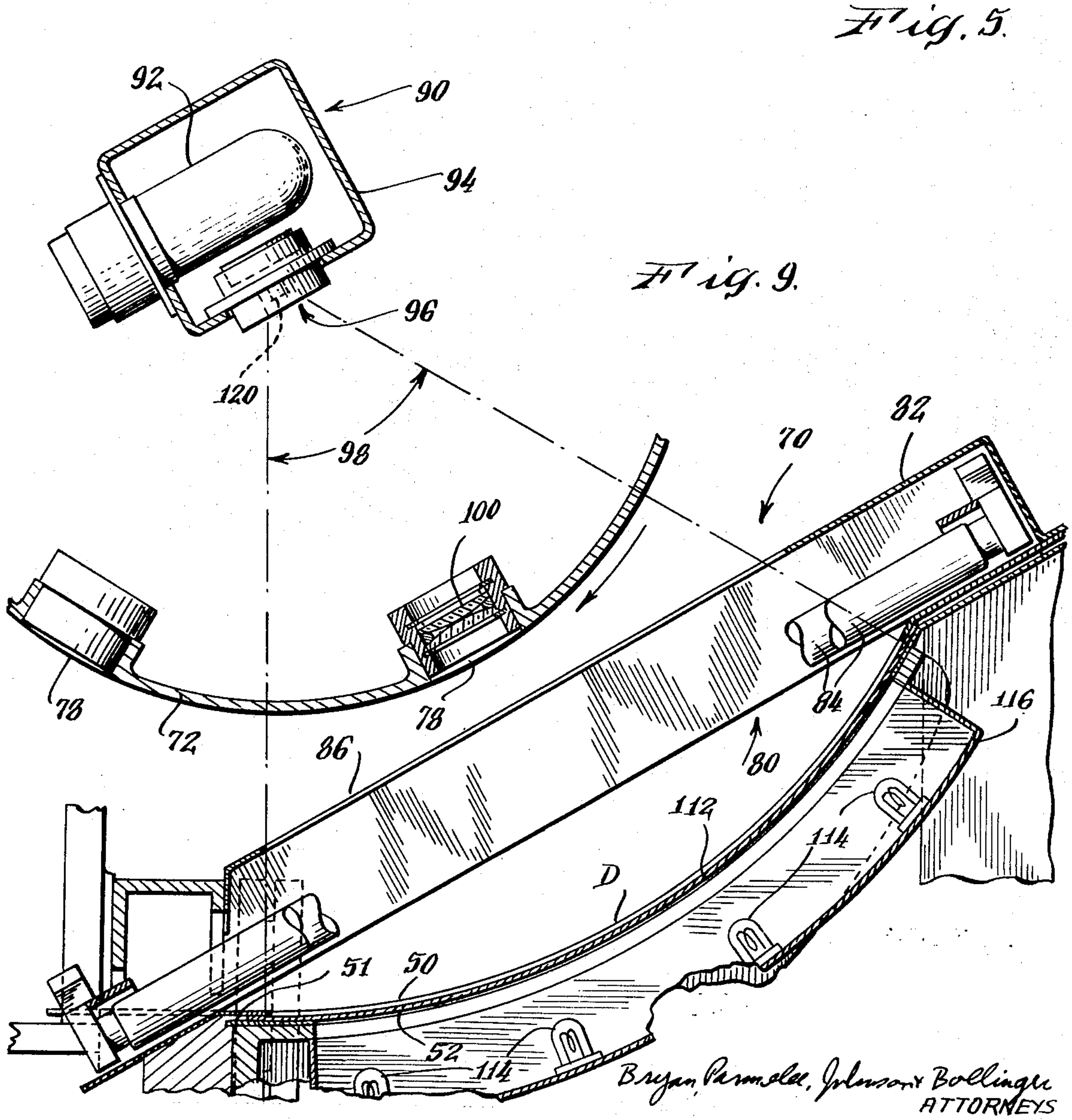
FIG. 9 is a section on line 9—9 of FIG. 6, to enlarged scale.

Referring now to FIGS. 6–9 and particularly FIG. 9, at scanning station 70 the scanning stage 28 positions a source 80 of ultraviolet radiation to be directed upon the exposed face portion of document D. As shown, the source 80 of ultraviolet radiation comprises a housing 82 holding ultraviolet-emitting tubes 84 on either side of the exposed portion of document D and being apertured at 86 to permit the scanning ports 78 on scanning wheel 72 to view document D.

A document D, being fed through arcuate guides 50, 52 past scanning station 70, and being illuminated with ultraviolet light from source 80, thus has its code symbols 44 in stimulated condition emitting visible wavelengths and is therefore in suitable state to have its coded information retrieved. Information retrieval takes place by detecting the presence of luminescing code symbols with a photodetector 90 whose field of view is successively directed across document D by the scanning ports 78 on scanning wheel 72. As shown, the photodetector 90 comprises a photosensitive element such as a photomultiplier tube 92 mounted within an opaque container 94 having an entrance aperture 96 which permits photomultiplier tube 92 to view through an angle 98 large enough to include within it the arc travelled by a scanning port 78 in viewing document D. Each scanning port 78 is provided with optical elements 100 forming a lens which focuses an image of the surface of document D upon the entrance aperture 96 of photodetector 90. By means of optical masking elements positioned at entrance aperture 96, the scanning field of view of document D is made sufficiently small to permit resolution of separate code symbols 44.

The scanning field F used with the code format previously mentioned is illustrated in FIG. 2 oriented in relation to character 40 and code symbols 44 for scanning thereacross. As shown, the scanning field F has a length L which is the same as the height H3 occupied by alphanumeric character 40 and code symbols 44, or 0.150 inches. It has a width *w* of 0.005 inches to permit the code symbols 44 to be distinguished.

As scanning field F is traversed across the face of document D, photomultiplier tube 92 is optically coupled to incremental areas of the document emitting different quantities of radiation and causing the electrical output of tube 92 to vary accordingly. The luminescing code symbols 44 will emit more strongly than the background of document D, including both unmarked areas and characters 40, which can only reflect radiation impinging upon them. Ultraviolet radiation is strongly absorbed and thus does not reflect from the background areas but there may be some ambient light available for reflection at scanning station 70 due to leakage or provided by light source 110 described below. Reflections of this ambient light from the surface of document D, however, are of lower intensity than the emitted light from code symbols 44, and their effect can be entirely eliminated by employing a threshhold device masking all responses of tube 92 at or below their level. An example of use of such a threshhold device is described below in connection with FIG. 18.

As indicated above, document feed 54 feeds a document D at a constant speed through scanning station 70, and scanning wheel 72 rotates at a constant speed, moving scanning field F transversely to the direction of document feed. The rate of document feed is correlated with the rotational speed of scanning wheel 72 such that the wheel 72 makes one complete revolution during the time it takes for the document to advance a distance equal to the height H3. Because there are six scanning ports 78 on scanning wheel 72, this means that each incremental area of document D will be viewed six times through scanning field F as it is passed successively over the document. Thus, while it is impossible for the scanning field F to cover more than one row of code symbols 44 at a time, there will be a redundancy of detection of a single row of code symbols 44. In other words, the same row of code symbols will be detected by two or more successive passes of field F, producing a redundancy in the detected information. By scanning a document D in this manner three benefits arise: it is unnecessary to synchronize paper feed with transverse scanning to line up a row of code symbols for detection with a single scan (there is no need to accurately position any line on a document or to add a line finding capability), and the redundancy in information can be used as a check on the integrity of detection. For example, information processing circuitry (not shown) which is coupled to photomultiplier tube 92, can be arranged to store the pattern of symbols received in a buffer or storage unit and compare the stored signals with those detected by the next scan, transmitting the signals only if a redundancy exists thus indicating an accurate reading. Once a redundancy is noted, and the signals forwarded to their destination, the scanner is turned off for the next several scans to prevent an erroneous duplication of signals from being transmitted. In addition, the information processing means can analyze the scanned information to determine if parity checks out properly. If the parity check fails, no information is transmitted. Finally, the information processing means can make a determination as to the acceptability of the information derived from the document. Based on this determination, the stacking stage 32 of apparatus 20 places the document either in accept drawer 34 or reject bin 36. The information processing means can be programmed to make this determination according to any suitable standards, such as the failure of the parity check, the lack of any redundancy on the entire document, or the failure of the document to include particular coded information. The stacking unit 32, responding in a manner to be described below, receives the document D from the scanning stage 28 and then in response to a control dispatches it according to the determination made by the information processing means.

Apparatus 20 is designed to retrieve information from documents D of differing widths and lengths, accommodating both documents as small as memo sheets (e.g. 4 × 5½ inches) and documents as large as legal size paper. One edge of document D is always located along edge guide 51 adjacent feed means 54. The other edge of document D will be positioned according to the document width. In order to positively indicate where this other document edge is, and thus to restrict scanning of the document's surface to avoid extraneous indications, scanning stage 28 is provided with a light source 110 located at scanning station 70 and radiating through a slot 112 through lower arcuate guide 52 in the plane along which scanning field F is traversed. As shown, light source 110 comprises an opaque housing 112 mounting a plurality of lamps 114. A document D at scanning station 70 will cover slot 112 over its width and prevent light from source 110 from reaching photodetector 90. Beyond the edge of document D, however, light will pass through slot 112 and will be focused by optical elements 100 on the entrance aperture 96 of photodetector 90. Disposed in the vicinity of entrance aperture 96 is a photosensor 120 used only for the purpose of detecting the document edge. Photosensor 120 responds to light from source 110 until it reaches document D, and the output of photosensor 120 is used in circuitry (not shown) to gate the output of photomultiplier tube 92 so that no information will be transmitted until the edge of document D is reached in the scanning path.

NOTE: (POSSIBLY FOR INFORMATION ONLY.) Present design allows documents between 4 × 5½ inches and 9 × 14 inches to be read. The long dimension of a document must be positioned along the edge guide.

Figure 6:
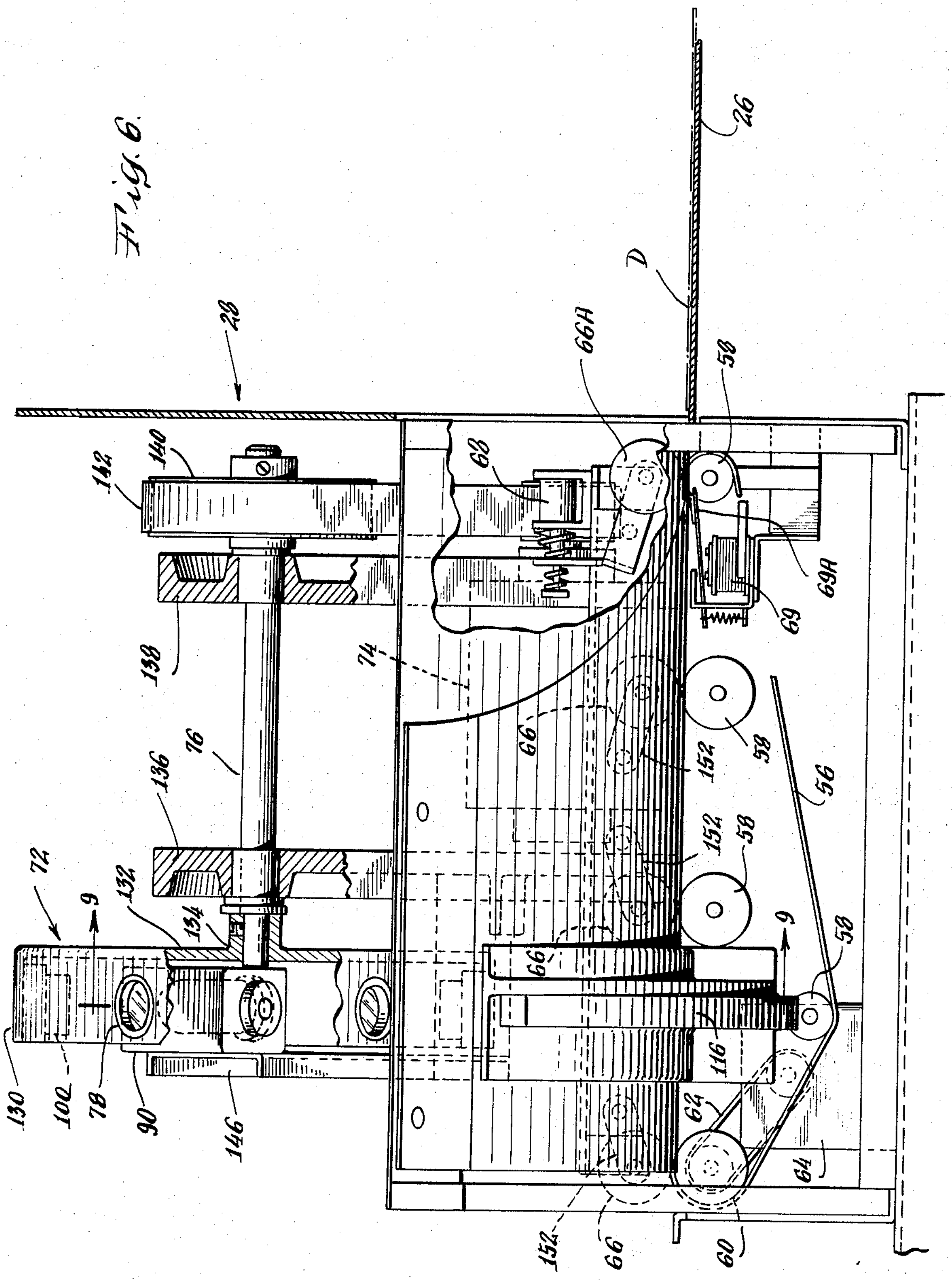
FIG. 6 is a front view, with portions broken away, illustrating the scanning stage of the apparatus depicted in FIG. 1.
Figure 7:
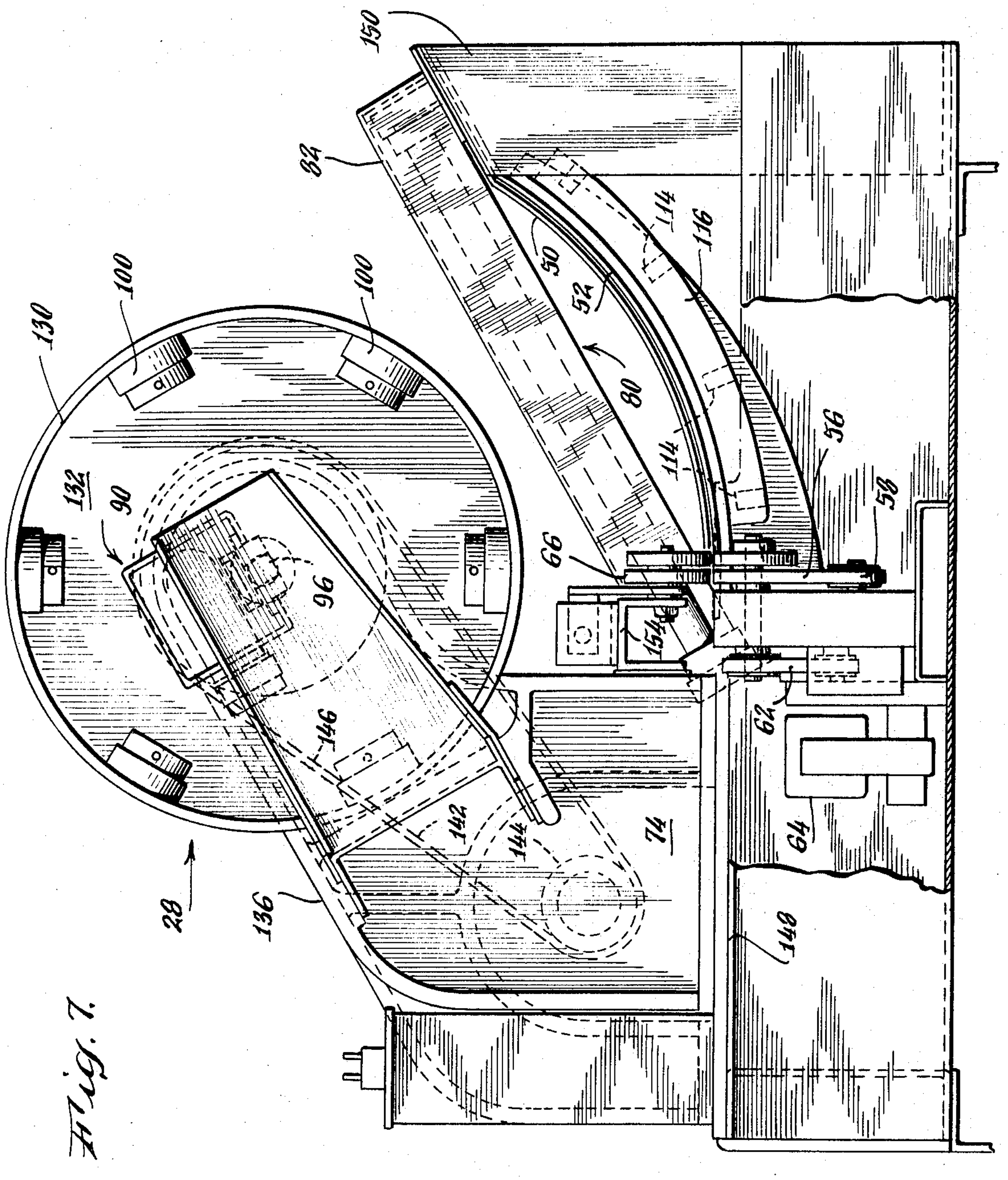
FIG. 7 is an end elevation of the scanning stage of the apparatus depicted in FIG. 1, as seen from the left end of FIG. 6.
Figure 8:
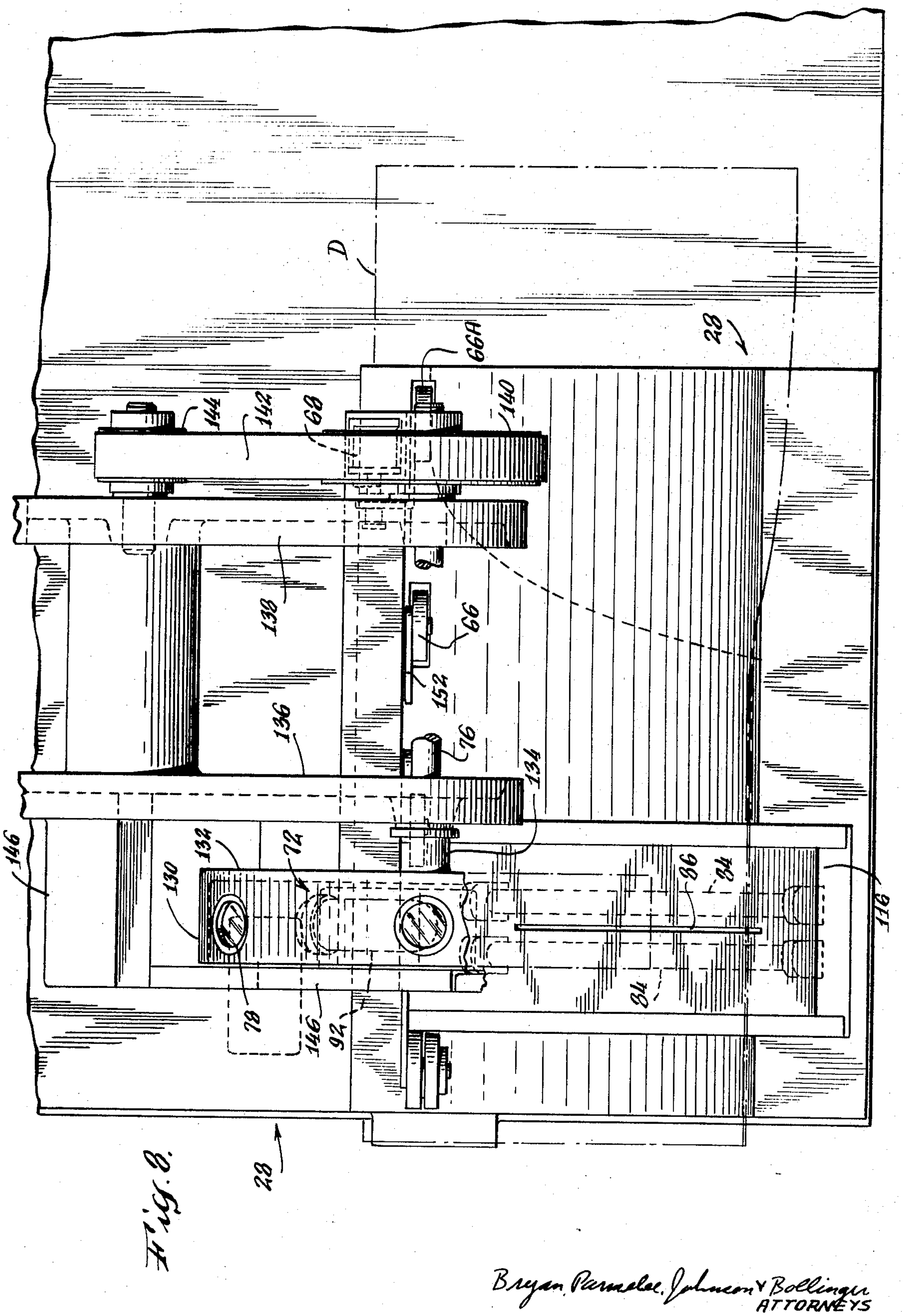
FIG. 8 is a plan view, with portions broken away, of the scanner stage of the apparatus depicted in FIG. 1.

FIGS. 6 through 8 illustrate additional construction features of scanning stage 28. As shown, scanning wheel 72 has a peripheral flange 130 having the scanning ports 78 therein, and carrying the optical elements 100. The peripheral flange 130 extends from a circular disc 132 having a hub 134 for attachment to shaft 76, and shaft 76 is supported for rotation in axially spaced frame members 136 and 138. A pulley 140 is attached to shaft 76 and carries a belt 142 trained around a second pulley 144 on motor 74. Photodetector 90 fits centrally within scanning wheel 72 and is fixedly mounted on a support arm 146 which is mounted to support member 136. The two support members 136 and 138 are in turn fastened to a main frame 148. As shown in FIG. 7, a support member 150 is fastened to frame 148 and provides support at scanning station 70 for ultraviolet source housing 82 and for arcuate guides 50 and 52. In document feed means 54, the idler wheels 66 are carried by spring biased idler arms 152 carried by a frame member 154. An opaque housing 156, as shown in FIG. 1, covers the scanning stage 28 and prevents any external radiation from reaching scanning station 70.

STACKING STAGE

After scanning, documents D continue to be propelled by feed means 54 along arcuate guides 50, 52, and eventually arrive at stacking stage 32 (illustrated in FIGS. 10 through 17). Stacking stage 32 abuts scanning stage 28 with an end wall 200 having an arcuate slot 202 (FIGS. 12, 15 and 16) through which the document is pushed by feed means 54.

Within stacking stage 32, the document D is picked up by a releasable feed means 204 and carried to an ejection station 230 between guide plates 220 and 222, its lower edge resting against edge guide 224 and over lift bar 226. At ejection station 230, there are situated two selectively engageable transverse feed means 240 and 280, feed means 240 being arranged to engage document D upon command and feed it to "accept" drawer 34, and feed means 280 being arranged to engage document D upon alternative command to feed document D to "reject" bin 36. Simultaneously as feed means 240 or 280 is actuated, the feed means 204 is released. As will be explained below, transverse feed means 240 and 280 contain continuously rotating parts to feed document D, and linear feed 204 is adapted to release document D just as soon as its trailing edge arrives at ejection station 230, and therefore documents D can be very rapidly and selectively segregated by stacking stage 32 without any need for interrupting the steady feed from scanner stage 28 by constant speed feed means 54.

Figure 12:
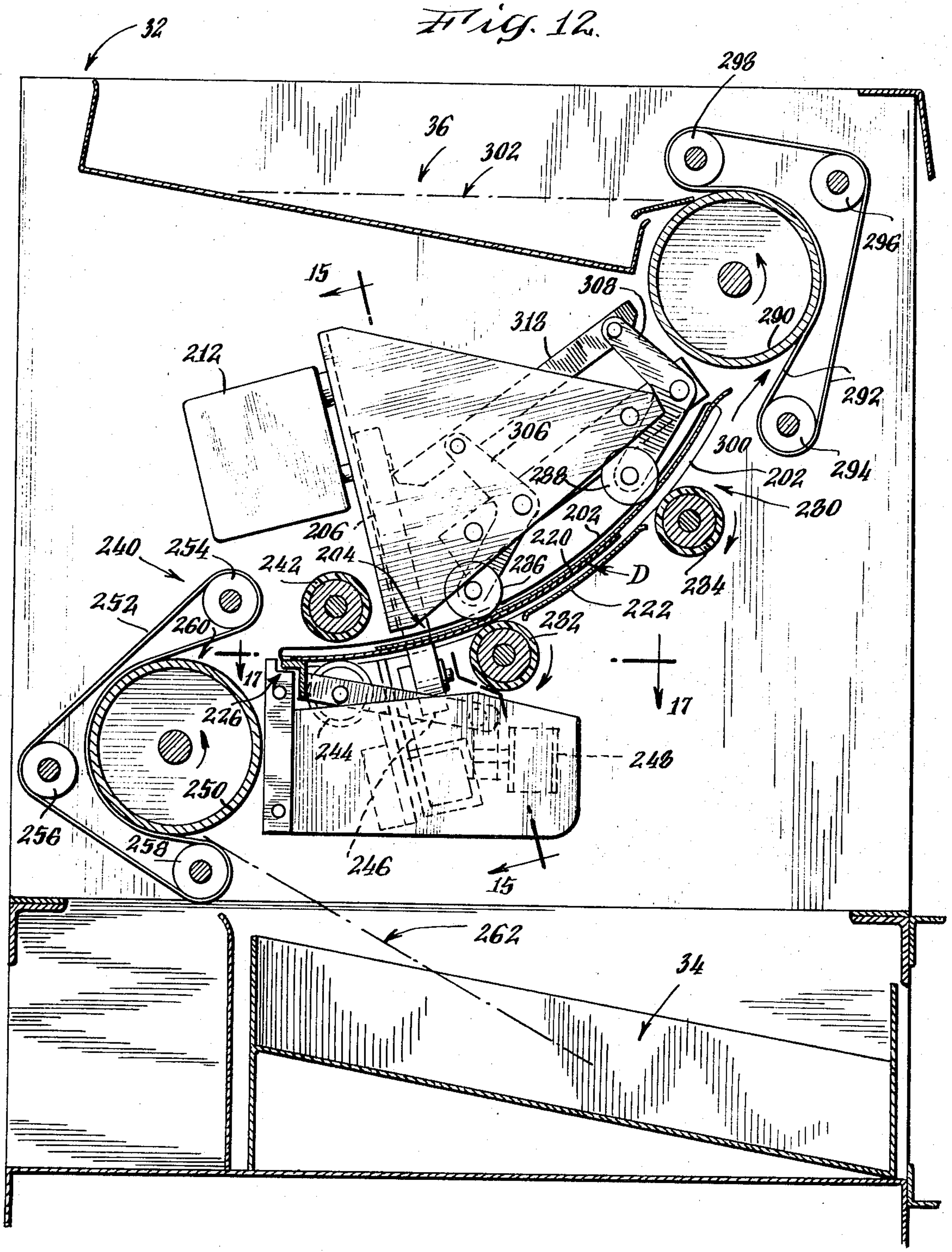
FIG. 12 is a section on line 12—12 of FIG. 11.
Figure 16:
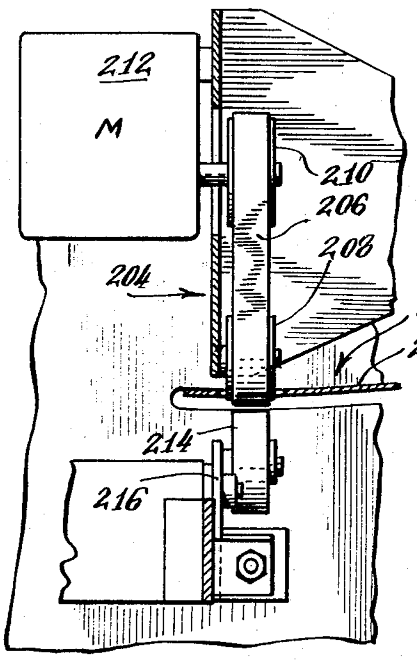
FIG. 16 is a section on line 16—16 of FIG. 15.
Figure 15:
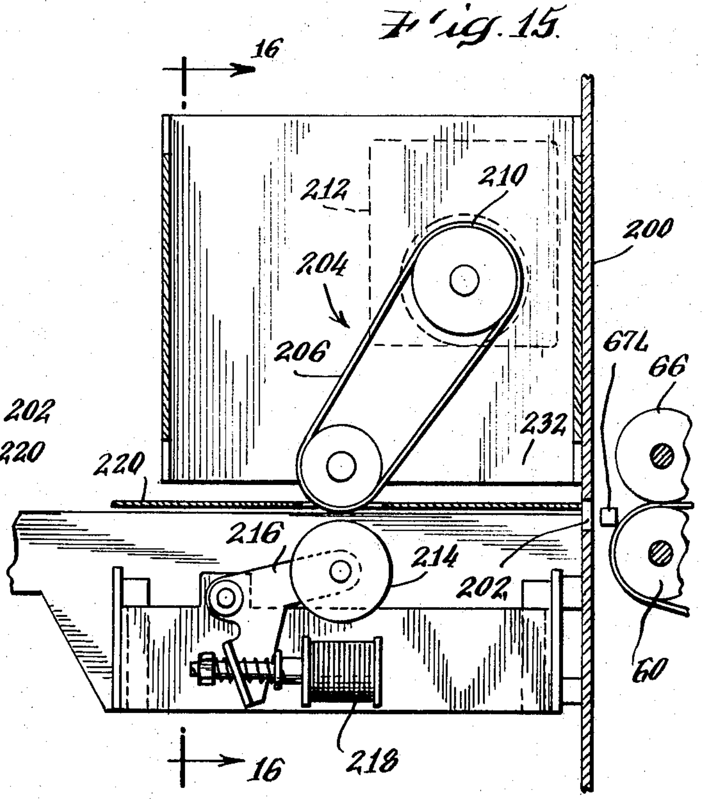
FIG. 15 is a section on line 15—15 of FIG. 12.

The releasable feed 204, shown in FIGS. 12, 15 and 16, continues the feed of documents at the same speed as feed means 54 of scanner stage 28, and comprises a feed belt 206 carried by pulleys 208, 210 and extending through an aperture in upper guide plate 220. A motor 212 drives belt 206 at a tangential speed equal to the speed at which document D is fed by feed means 54. An idler wheel 214, mounted on a bell crank 216, resiliently pushes toward belt 206 during document feed but is arranged to be retracted from belt 206 by a solenoid 218 which pivots bell crank 216 when the document D reaches the ejection station 230 and transverse feed means 240 or 280 is engaged.

To determine when document D is completely within ejection station 230 and therefore capable of transverse feed by feed means 240 or 280, the last edge sensor photocell 67L is used to detect the passage of the document trailing edge. The sensor 67L responds as the document trailing edge passes over it and controls a time delay circuit or device (not shown) which can then be used to indicate when the document trailing edge has reached a point such as 232 just within the ejection station 230, and such circuit or device may be used to control the onset of engagement of transverse feed means 240 and 280. Alternatively, a reflective sensor positioned at point 232 to the left of plate 200 (FIG. 11) may be used in place of photocell 67L and the time delay circuit.

Figure 17:
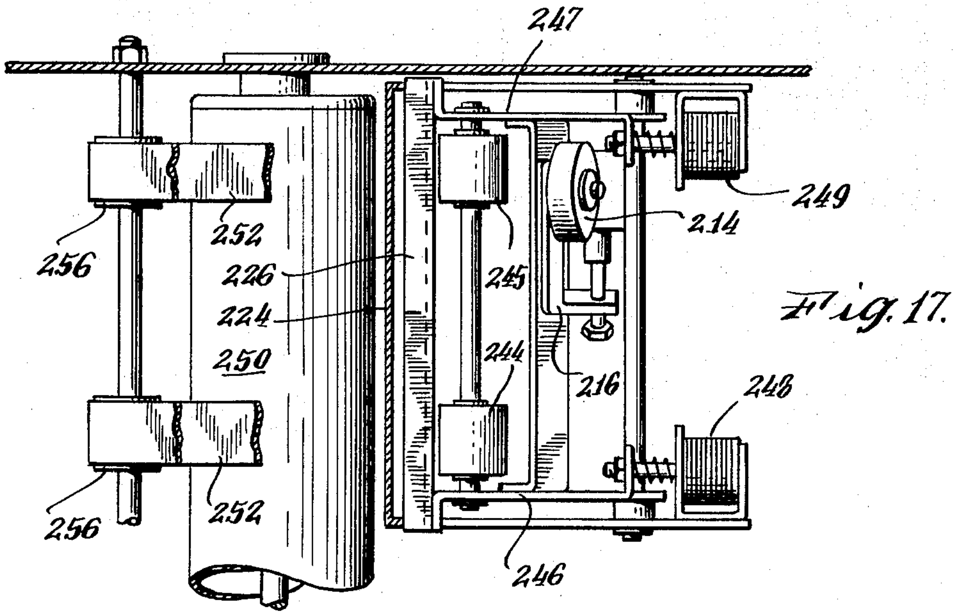
FIG. 17 is a section on line 17—17 of FIG. 12.

Feed means 240, which is arranged to feed documents from ejection station 230 to accept drawer 34, comprises a constantly rotating drive roll 242 positioned adjacent ejection station 230 on one side of a document D, and idler rolls 244 and 245 on the opposite side of document D and arranged to be urged against drive roll 242 to engage a document therebetween. As shown in FIGS. 12 and 17, idler rolls 244 and 245 are carried by bell cranks 246 and 247 which also carry lift bar 226 and which are caused to rotate by solenoids 248 and 249. The unengaged position of idler rolls 244 and 245 is illustrated in FIG. 12. When a document D is to be engaged by feed means 240, solenoids 248 and 249 are energized by a control circuit (not shown) to rotate bell cranks 246 and 247 (clockwise in FIG. 12), thereby lifting idler rolls 244 and 245 into engagement with document D and drive roll 242. Simultaneously, lift bar 226 is raised, lifting the edge of document D above edge guide 224 so that the document D can be ejected thereover.

Once a document D has been engaged between drive roll 242 and idler rolls 244 and 245 and has been lifted above edge guide 224, it is propelled over edge guide 224 (to the left as shown in FIG. 12). To direct document D to accept drawer 34, feed means 240 includes a reversing drum 250 and belts 252 trained over pulleys 254, 256, and 258 so that belts 252 contact drum 250 over approximately half its circumference and form an inlet guide 260 funneling a document D between wheel 250 and belt 252. Once it has been gripped between drum 250 and belt 252, a document D is carried around the drum to be expelled into accept drawer 34, substantially following the path indicated by dashed line 262. The documents will be stacked in accept drawer 34, face down, in the same order in which they have been processed by apparatus 20, thus eliminating any need for rearranging the documents.

Figure 13:
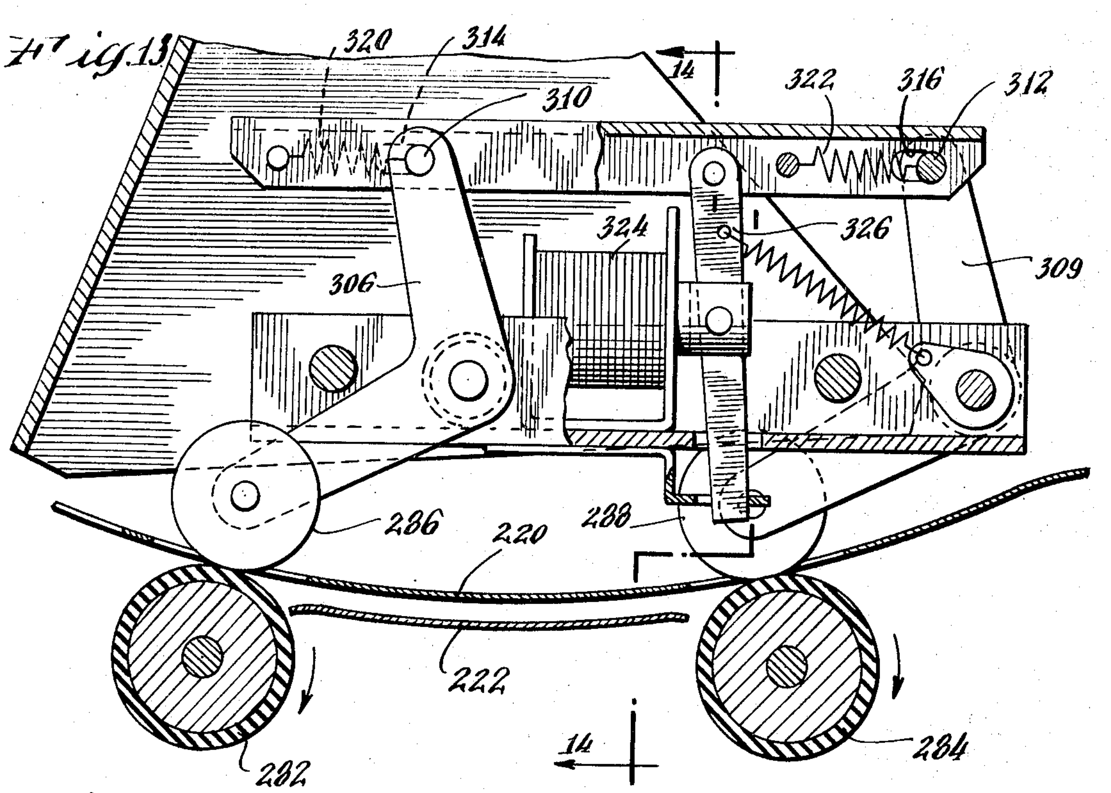
FIG. 13 is a view of a portion of FIG. 12, to enlarged scale.
Figure 14:
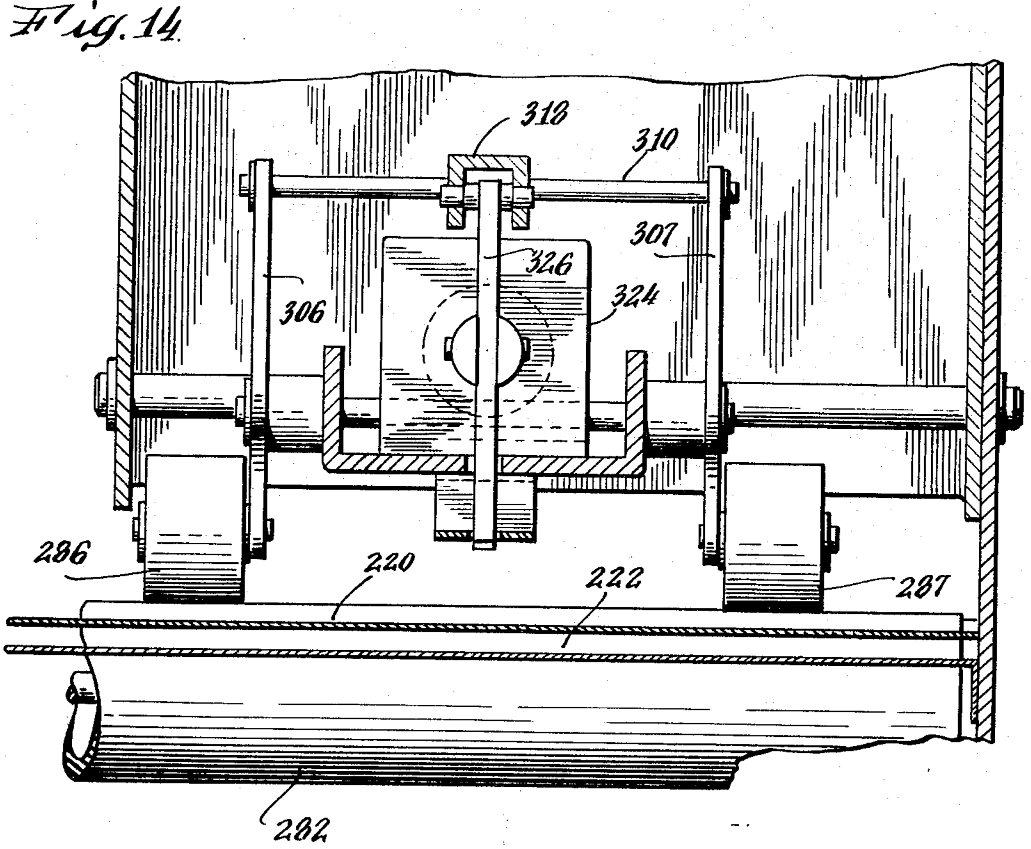
FIG. 14 is a section on line 14—14 of FIG. 13.

Documents which have not been engaged by feed means 240 and placed in accept drawer 34, are instead ejected by feed means 280 to reject bin 36. As shown in FIGS. 12 through 14, feed means 280 comprises constantly rotating drive rolls 282, and 284 positioned beneath the document D in ejection station 230, and corresponding idler rolls 286, 287, and 288, 289 positioned above document D and arranged to be respectively urged against drive rolls 282, 284 to engage document D therebetween and to propel it transversely away from the ejection station 230. A document so engaged is directed upward and to the right as seen in FIG. 12, to a reversing drum 290. Reversing drum 290 has belts 292 trained over pulleys 294, 296, and 298 so as to make contact with a portion of the circumference of drum 290, and to form an inlet passage 300 to direct a document between the drum 290 and belt 292. A document engaged by drum 290 and belt 292 is carried therearound to reject bin 36, substantially along a path indicated by dashed line 302. To prevent the document from wrapping around drum 290, a doctor blade 304 is positioned to lift the document from the drum.

Feed means 280, as shown, is provided with two regions of engagement along the width of document D so as to be able to accommodate documents of varying width. Engagement of a document is brought about by urging idler rolls 286–289 against drive rolls 282, 284 in response to a command provided by control circuitry (not shown). As shown in FIGS. 13 and 14, the two idler rolls 286, 287 are carried by bell cranks 306, 307 which are linked by a bar 310. Similarly, idler rolls 288, 289 are carried by bell cranks 308, 309 linked by a bar 312. The bars 310, 312 are simultaneously moved in order to engage idler rolls 286 through 289 by means of a channel-shaped link 318 having slots 314 and 316 receiving the bars 310 and 312, respectively, with springs 320 and 322 resiliently holding the bars toward one end of the slots. A solenoid 324, working through a spring biased lever 326 engaging link 318, moves link 318 so as to exert a force on bars 310, 312 through springs 320 and 322. The bars 310, 312 in turn rotate bell cranks 306–309 to cause the idler rolls 286-289 to move into engagement with a document D in ejection station 230. Preferably the bars 310, 312 are loosely attached to the bell cranks 306–309, so that the mechanical coupling extending from solenoid 324 to the four idler rolls 286–289 has a moderate amount of play which means that the four idler rolls will be pushed after initial contact with approximately the same amount of force against driven rolls 282, 284 to provide an even, non-twisting feed of document D from ejection station 230 to reject bin 36.

Figure 11:
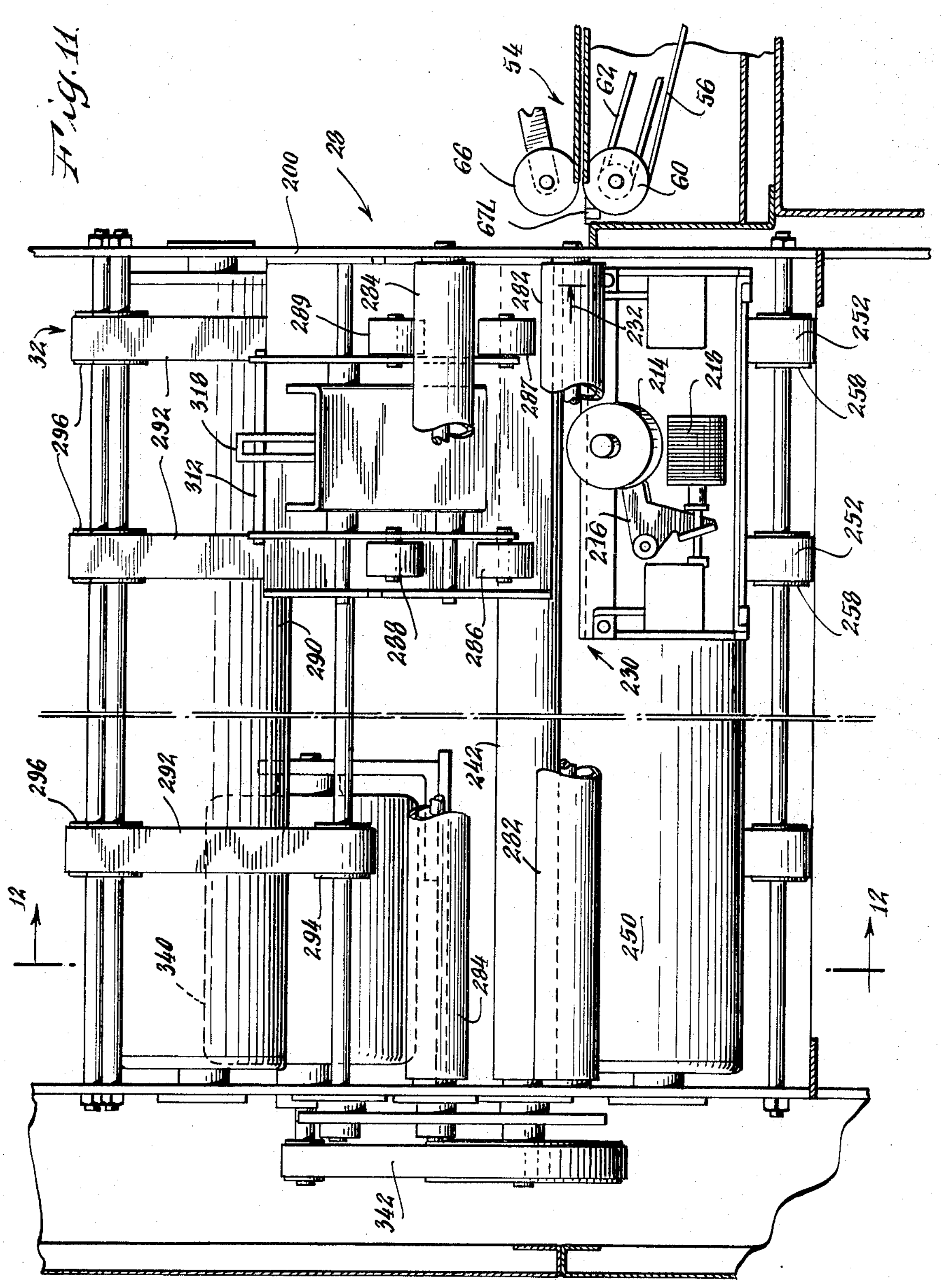
FIG. 11 is a front elevation of the stacking stage of the apparatus depicted in FIG. 1.

As shown in FIG. 11, the idler rolls 286–289 which engage a document D for ejection are located near the entrance slot 202 of stacking stage 32 to be able to accommodate short documents. Longer documents may extend substantially beyond the idler rolls 286–289, but are still capable of being engaged thereby tp successfully propel a document D along the path toward reject bin 36.

Figure 10:
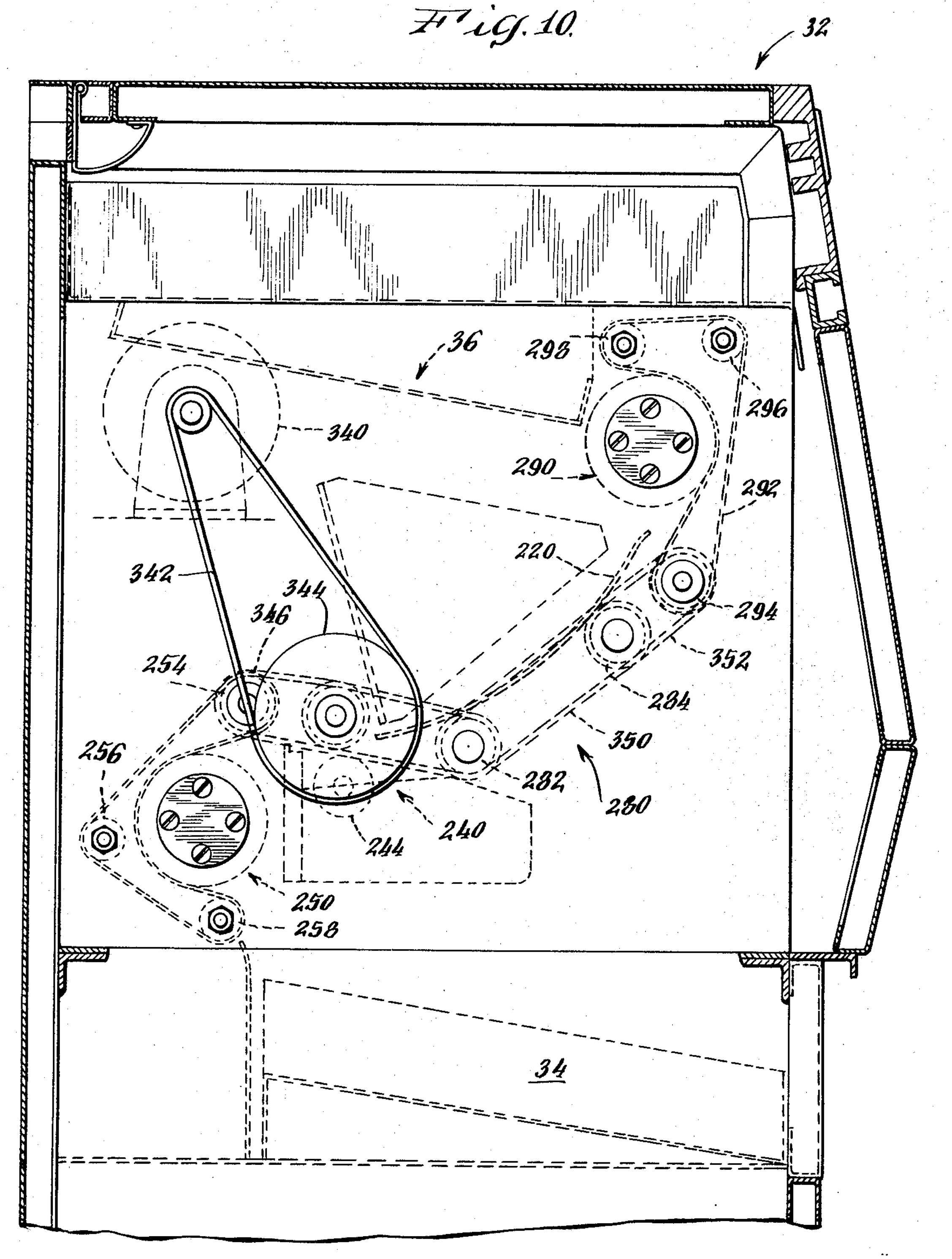
FIG. 10 is a left end elevation of the apparatus depicted in FIG. 1, showing portions of the stacking stage thereof.

Feed means 240 and 280 are powered by a motor 340 mounted within stacking stage 32. (FIGS. 10 and 11). Motor 340 is connected by drive belt 342 to a pulley 344 which turns drive roll 242. A second drive belt 346 couples drive roll 242 to belt guide roll 254, a third belt 348 couples drive roll 242 to drive roll 282, a fourth drive belt 350 couples drive roll 282 to drive roll 284, and a fifth drive belt 352 couples drive roll 284 to belt drive roll 294. For one or more of the belts 342, 346, 348, 350, or 352, drive chains can be substituted, and a single belt or chain can be used in place of the multiple belts shown. Naturally, the various drive belts or chains are arranged so that the rate of feed in feed means 240 is constant and the rate of feed in feed means 280 is constant.

From the foregoing description it can be seen that both feed means 240 and feed means 280 include constantly rotating feed elements which are capable of propelling a document from ejection station 230 to accept drawer 34 or reject bin 36. The idling elements which are moved in order to engage the document are designed to have low inertia, so that they can be moved rapidly into engagement and rapidly assume the speed of the driven roll members. Toward this end, the idler rolls 244 and 286–289 are preferably made of a lightweight material such as Delrin or nylon. Since none of the moving parts are required to stop, start or accelerate, it is apparent that no clutches, brakes or the like are needed, and stacking stage 32 can be run at a fairly high rate of speed to process a rapid succession of documents fed from scanner stage 28.

APPARATUS CONTROL

Figure 18:
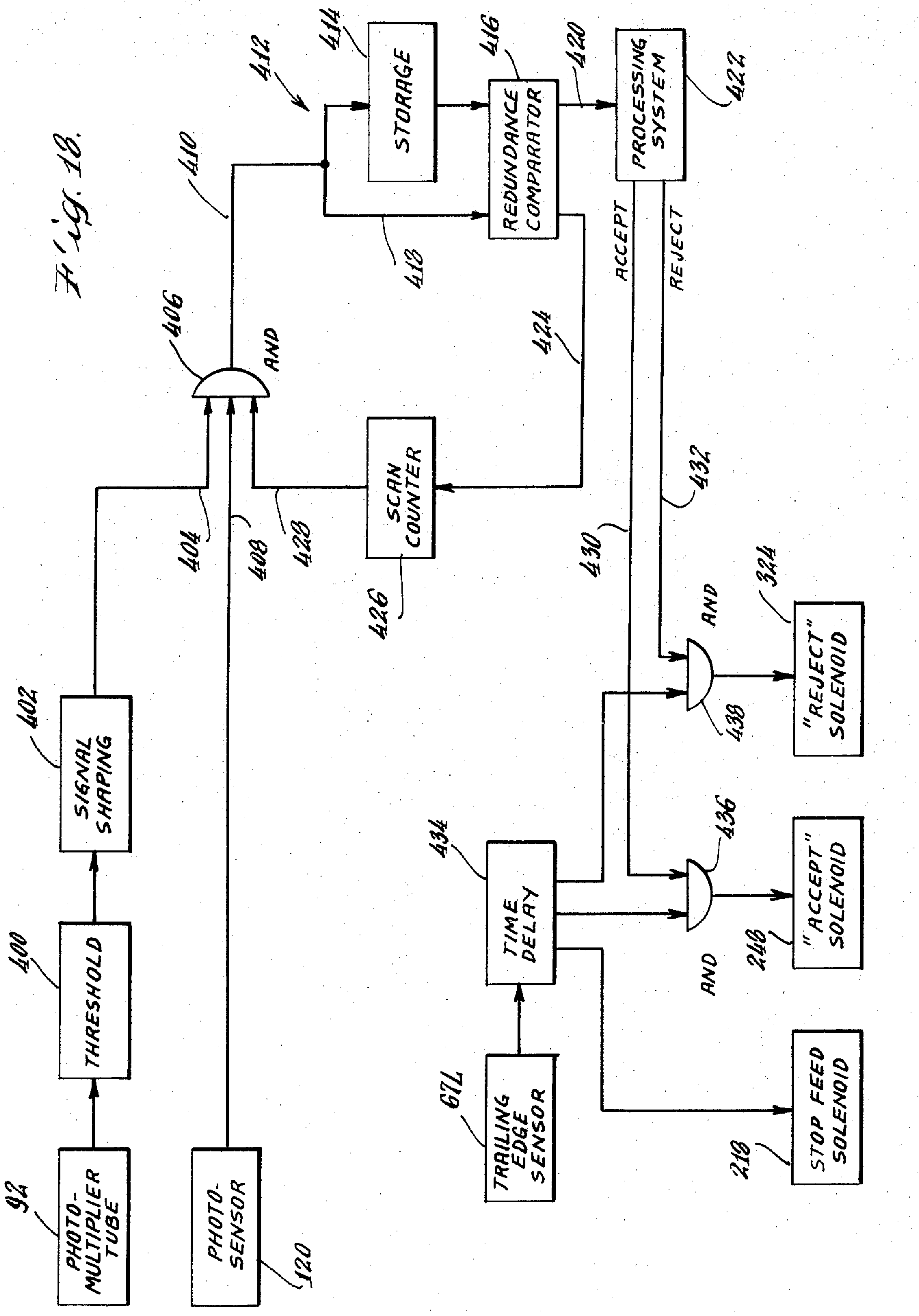
FIG. 18 is a diagram of various apparatus controls.

FIG. 18 illustrates schematically an example of controls provided by and utilized in scanning stage 28 and stacking stage 32 as described above. As illustrated, photomultiplier tube 92 is connected to a threshhold circuit 400 which passes signals only above a specified level which is selected to be below the level of signals from luminescing code symbols 44, but above any signals from the alphanumeric characters 40 or the remainder of the background of document D. The threshhold circuit 400 therefore distinguishes the code information from spurious signals, and passes to a signal shaping circuit 402 a signal which varies only according to detected code symbols 44. The signal shaping circuit 402, in conventional fashion, shapes the signal for use in subsequent digital circuitry.

The code-bearing signal from shaping circuit 402 appears at a first input 404 of AND gate 406. The output of photosensor 120 appears at a second input 408 of AND gate 406, and thus permits the output of photomultiplier tube 92 to be utilized only when photosensor 120 detects the presence of a document within scanning field F at scanning station 70.

The output 410 of AND gate 406 passes to a redundancy checking circuit 412, which is illustrated as comprising a buffer or storage circuit 414 which receives a line of code symbol information detected by one scan and stores it until the subsequent line is read, at that time passing it to a comparator circuit 416 which receives the subsequent line on input 418 and compares it with the stored line from storage circuit 414. If the two successive lines are the same, the information is transmitted over output line 420 to information processing system 422, which may utilize the information in computation, store the information, or in some other way make use of the information contained in documents D. Also, when the redundancy is noted, a signal is sent on output line 424 to start the operation of a scan counting circuit 426 which removes an enabling signal from input 428 of AND gate 406 for several subsequent scans, thereby preventing the output of photomultiplier tube 92 from reaching redundancy checking circuit 412 and preventing any information from reaching processing system 422 until the next row of code symbols is scanned.

As illustrated, processing system 422 is designed to analyze the coded information and, on the basis of that analysis, send a signal on output line 430 if the document has the characteristics prescribed for accept drawer 34, or a signal on output line 432 if the document has the characteristics prescribed for reject bin 36. As shown, output line 430 is connected to "accept" solenoid 248 through AND gate 436, and output line 432 is connected to "reject" solenoid through AND gate 438. Timing of the operation of "accept" solenoid 248 or "reject" solenoid 324 in response to signals on output line 430 or 432 is controlled by photocell 67L which indicates when the trailing edge of document D passes thereover. A time delay circuit 434 delays the output of photocell 67L until the document has its trailing edge within ejection station 230 at point 232, and the delayed indication simultaneously energizes solenoid 218 to stop linear feed of the document, and enables AND gates 436 and 438 to actuate whichever of solenoids 248 and 324 is to be used in ejecting a document to its appropriate stacking location.

As will be apparent to those skilled in the art, many suitable devices exist to do the tasks of the circuits illustrated schematically in FIG. 18, and other circuits and arrangements can be substituted to perform the functions of checking for redundancy, threshhold limiting, controlling the photomultiplier tube 92 with photosensor 120, and timing the ejection of documents from ejection station 230.

It should be understood that the foregoing description is for the purpose of illustration and that the invention includes all modifications falling within the scope of the appended claims.

What is claimed is:

1. An apparatus for automatically retrieving coded information from documents of the type bearing rows of alphanumeric characters imprinted with a visible material, and for each such character a group of adjacent code symbols imprinted with a photoluminescent material which is essentially invisible but can be stimulated with ultraviolet radiation to emit visible radiation, the code symbols being arranged in rows between and parallel to said character rows and being formed as bars extending in a direction normal to said rows, comprising:

means for feeding said documents at uniform speed along a path past a scanning station with said code symbol rows oriented transverse to said path; including means guiding and holding said documents in an arcuate shape as they are fed along said path, the arc axis being parallel to said path, means located at said scanning station for illuminating the face of the documents with stimulating ultraviolet radiation thereby causing said code symbols to emit radiation;

means at said scanning station for continuously scanning across said documents in a direction transverse to said path and parallel to said code symbol rows, said scanning means comprising an apertured scanning wheel rotating at uniform speed, having an axis of rotation coaxial with said arc axis, the radius of curvature of said arc coinciding with that of said scanning wheel a photodetector positioned at said axis for viewing said documents through said apertured wheel, said apertured scanning wheel comprising a plurality of peripheral apertures each having lens means said lens means providing an optical path between said documents and said photodetector for scanning across the documents, thereby focussing an image of said document face on said photodetector, said photodetector being responsive to the radiation emitted by said stimulated code symbols, and said photodetector having a field of view which extends along said path direction a distance greater than the height of the code symbol bars;

means correlating the speed of documents along said path with the scanning rate such that each row of code symbols is scanned at least twice; and the entire face of the document is scanned;

whereby the information derived from successive scans can be compared to check accuracy and completeness of detection;

means for limiting the photodetector response to the radiation emitted by said stimulated code symbols;

whereby only said code symbols are detected notwithstanding the presence of said alphanumeric characters.

2. Apparatus as claimed in claim 1 further comprising means for blocking other than said stimulating radiation from reaching the face of the documents at said scanning station whereby said alphanumeric characters are substantially invisible to said photodetector.

3. Apparatus according to claim 1 wherein said means limiting the response to the photodetector comprises threshhold means accepting electrical signals from the photodetector and eliminating from said signals all responses below a specified signal level.

4. Apparatus as claimed in claim 1 wherein said lens means comprises a plurality of equally circumferentially spaced lens apertures in said peripheral portion, whereby said documents are scanned a plurality of times for each rotation of the scanning wheel.

5. Apparatus as claimed in claim 4 wherein said photodetector is provided with optical masking means for limiting the photodetector field of view to a single one of said lens apertures.

6. Apparatus as claimed in claim 1 wherein said correlating means provides scanning of each row of code symbols at least three times, and further comprising means for comparing the responses of said photodetector during successive scans of a row of code symbols, for issuing a response to row of code symbols only if a redundancy exists, and for disabling said photodetector for at least the first scan following said reduncancy, information processing means receiving the issued response of said comparing means and having output means for indicating a characteristic of said documents, and means responsive to said output means for segregating documents according to said characteristic.

7. Apparatus as claimed in claim 6 further comprising in said segregating means, means for feeding documents from said scanning station to an ejection station;

first transverse feed means at said ejection station for feeding documents of one characteristic therefrom along a first path; and second transverse feed means at said ejection station for feeding documents of another characteristic therefrom along a second path, said first and second feed means each comprising a constantly moving transverse feed device and a corresponding selectively operable means for engaging a document at the ejection station with the feed device, means for detecting the arrival of a document trailing edge within said ejection station, and wherein said engaging means being responsive to said detecting means, and means for stacking documents fed along said first and second paths.

* * * * *